US008977907B2

(12) United States Patent
Ghazanfari

(10) Patent No.: US 8,977,907 B2
(45) Date of Patent: Mar. 10, 2015

(54) CONTROL SYSTEM TO IDENTIFY FAULTY CODE MODULES

(71) Applicant: Caterpillar Inc., Peoria, IL (US)

(72) Inventor: Behrouz Ghazanfari, Plainfield, IL (US)

(73) Assignee: Electro-Motive Diesel, Inc., LaGrange, IL (US)

( * ) Notice: Subject to any disclaimer, the term of this patent is extended or adjusted under 35 U.S.C. 154(b) by 56 days.

(21) Appl. No.: 13/751,362

(22) Filed: Jan. 28, 2013

(65) Prior Publication Data

US 2014/0215275 A1     Jul. 31, 2014

(51) Int. Cl.
  *G06F 11/36*     (2006.01)
(52) U.S. Cl.
  CPC ........ *G06F 11/3668* (2013.01); *G06F 11/3636* (2013.01)
  USPC ...................................................... 714/38.1
(58) Field of Classification Search
  CPC ... G06F 11/08; G06F 11/0787; G06F 11/366; G06F 11/3688; G06F 11/3604; G06F 11/3692; G06F 11/3684; G06F 11/36; G06F 8/70
  See application file for complete search history.

(56) References Cited

U.S. PATENT DOCUMENTS

| 5,528,165 | A | 6/1996 | Simovich et al. |
| 5,963,718 | A | 10/1999 | Muramatsu |
| 6,041,425 | A * | 3/2000 | Kokunishi et al. .............. 714/37 |
| 6,463,559 | B1 | 10/2002 | Murphy |
| 7,210,123 | B2 * | 4/2007 | Makiyama .................... 717/120 |
| 2003/0056151 | A1 * | 3/2003 | Makiyama ....................... 714/38 |
| 2004/0019771 | A1 * | 1/2004 | Quach .......................... 712/229 |
| 2006/0143608 | A1 | 6/2006 | Dostert et al. |
| 2009/0113393 | A1 * | 4/2009 | Kho et al. ..................... 717/124 |
| 2009/0138854 | A1 * | 5/2009 | Mani ............................. 717/124 |
| 2012/0159261 | A1 | 6/2012 | Maybee et al. |

* cited by examiner

*Primary Examiner* — Nadeem Iqbal
(74) *Attorney, Agent, or Firm* — Finnegan, Henderson, Farabow, Garrett & Dunner, LLP

(57) ABSTRACT

The present disclosure is directed to a control system for a machine. The control system has an electronic module containing at least one programmable controller. The at least one programmable controller stores a plurality of code modules, and be configured to identify from the plurality of code modules a module that contains a code fault. The at least one programmable controller identifies the code fault by executing, with the at least one programmable controller, the code module, writing a code execution status to a designated memory location on the electronic module, and identifying, based on the code module execution status, the code module that contains the code fault.

18 Claims, 5 Drawing Sheets

CONTROL SYSTEM TO IDENTIFY FAULTY CODE MODULES

TECHNICAL FIELD

The present disclosure relates generally to a control system, and more particularly, to a machine control system for identifying faulty code modules.

BACKGROUND

Machines such as traditional locomotives are known to use a centralized on-board computer-based control system. Typically, such conventional control systems for a machine may include a central processing unit on the machine. Control system software consists of a plurality of code modules that are executed, or processed by the computer processors. When one of the code modules does not execute as intended (typically due to a coding defect), it can corrupt data or prevent other functions from running. For example, a fault in one of the code modules may cause the system to enter into a failure condition, or necessitate a system reset by going into an infinite loop that causes the control system to malfunction. Typically the faulty code module is in the middle of executing its code when the system enters into a failure condition.

Currently, when the user of the control system reports a malfunctioning machine controller, the technician's first goal is to identify the one or more code modules that contain the code fault. One method for identifying a faulty code module is identifying the code modules that were executing (processing the module's instructions in a central processor) just prior to when the control system entered into a failure condition. Control software may be engineered for each fault occurrence by writing and installing a custom program code that assists the technician with identifying the faulty code module. However, current machine control systems may contain thousands of code modules. Detecting the source of one or more code faults may require multiple iterations of control software, and each iteration may be installed on each of the thousands of code modules. Further, intermittent faults in code modules may not repeat for a prolonged period of time, adding yet another complication to detecting the faulty code module.

One exemplary method used to indicate a fault in a control system is described in U.S. Pat. No. 6,463,559 B1 (the '559 patent). The '559 patent describes a system that is configured for detecting both repeatable and intermittent fault conditions in a computer system. However, the complexity of new control systems may introduce problems to systems such as that described in the '559 patent. For example, the system described in the '559 patent appears to indicate and record whether a fault has occurred on a control system, and employs a recovery routine when a fault is indicated. However, the system of the '559 patent is silent with regard to other factors needed in the discovery of a particular faulty control module. For example, the system described in the '559 patent is not configured to detect which code module, in a network containing possibly hundreds or more such modules, is responsible for multiple system failures.

The presently disclosed control system is directed to overcoming one or more of the problems set forth above and/or other problems in the art.

SUMMARY OF THE INVENTION

In accordance with one aspect, the present disclosure is directed to a control system that includes an electronic module, the electronic module including at least one programmable controller storing a plurality of code modules, and a non-volatile memory in communication with the at least one programmable controller. The at least one programmable controller is configured to identify from the plurality of code modules a code module that contains a code fault. The controller may identify the code module that contains a code fault by executing the plurality of code modules, writing a code module execution status to a designated memory location on the electronic module, and identifying the code module that contains the code fault based on the code module execution status.

According to another aspect, the present disclosure is directed to a method for identifying a code fault in an electronic module. According to the method disclosed, the method includes storing a plurality of code modules on an electronic module, wherein the electronic module comprises a non-volatile memory having a plurality of designated memory locations. The method further includes executing, with at least one programmable controller, the code module from the plurality of code modules, writing, a code module execution status to a designated non-volatile memory location of the plurality of designated memory locations, and identifying, based on the code module execution status, the code module that contains the code fault.

DETAILED DESCRIPTION

Figure 1:
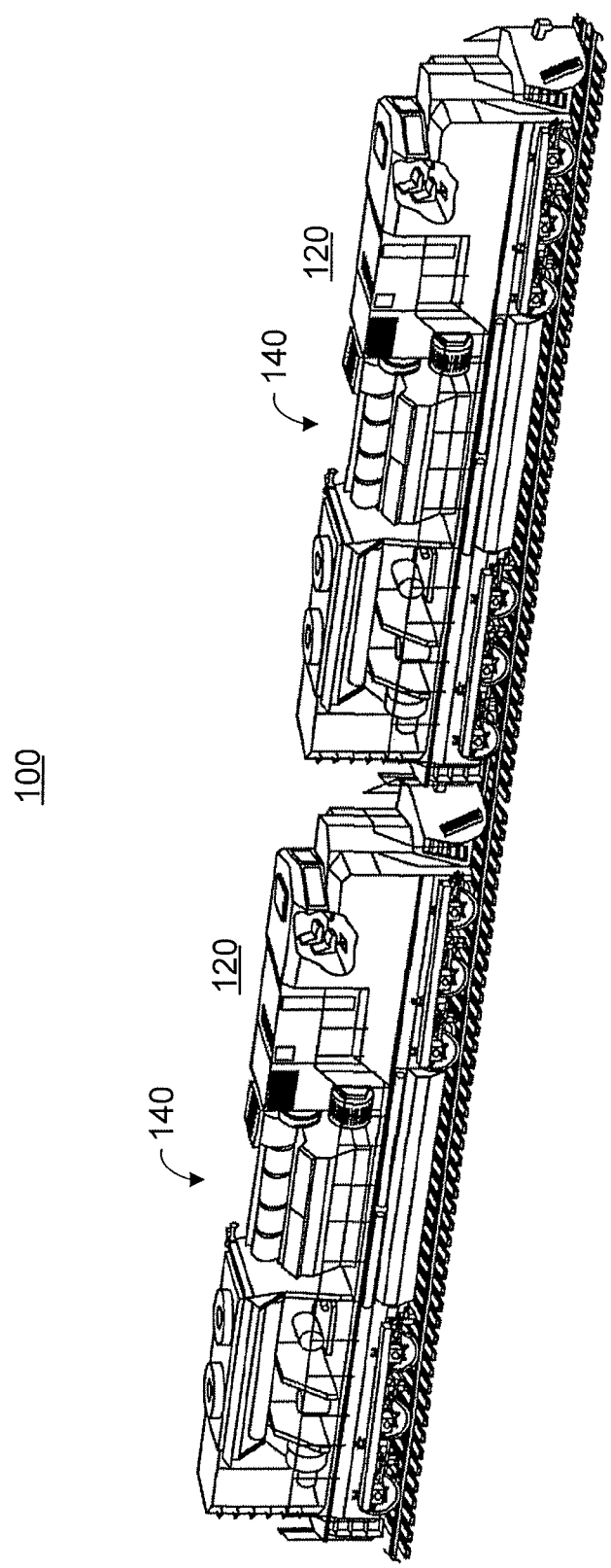
FIG. 1 illustrates a pictorial view of an exemplary disclosed machine.

FIG. 1 illustrates an exemplary machine 100. Machine 100 may embody an autonomous, semi-autonomous or manually controlled machine. For example, machine 100 may be a plurality of locomotives 120 (shown in FIG. 1), a wheel loader, a motor grader, or any other mobile machine known in the art. Machine 100 may alternatively embody another type of machine, such as an on-road vehicle, an off-road vehicle, a passenger vehicle, a stationary generator set, a pumping mechanism, or any other suitable operation-performing machine.

Each locomotive 120 of machine 100 may include a locomotive engine 140. In one embodiment, locomotive engine 140 may comprise a uniflow two-stroke diesel engine system. Those skilled in the art will also appreciate that each locomotive 120 may also, for example, include an operator cab (not shown), facilities used to house electronics, such as electronics lockers (not shown), protective housings for locomotive engine 140 (not shown), and a generator used in conjunction with locomotive engine 140 (not shown). While not shown in FIG. 1, machine 100 may comprise more than two locomotives 120. Additionally, machine 100 may also comprise a variety of other railroad cars, such as freight cars or passenger cars, and may employ different arrangements of the cars and locomotives to suit the particular use of machine 100. In an embodiment, the locomotives within machine 100 communicate with each other through, for example, wired or wireless connections between the locomotives. Particular examples of such connections may include, but are not limited to, a wired Ethernet network connection, a wireless network connection, a wireless radio connection, a wired serial or parallel data communication connection, or other such general communication pathway that operatively links control and communication systems on-board machine 100.

Figure 2:
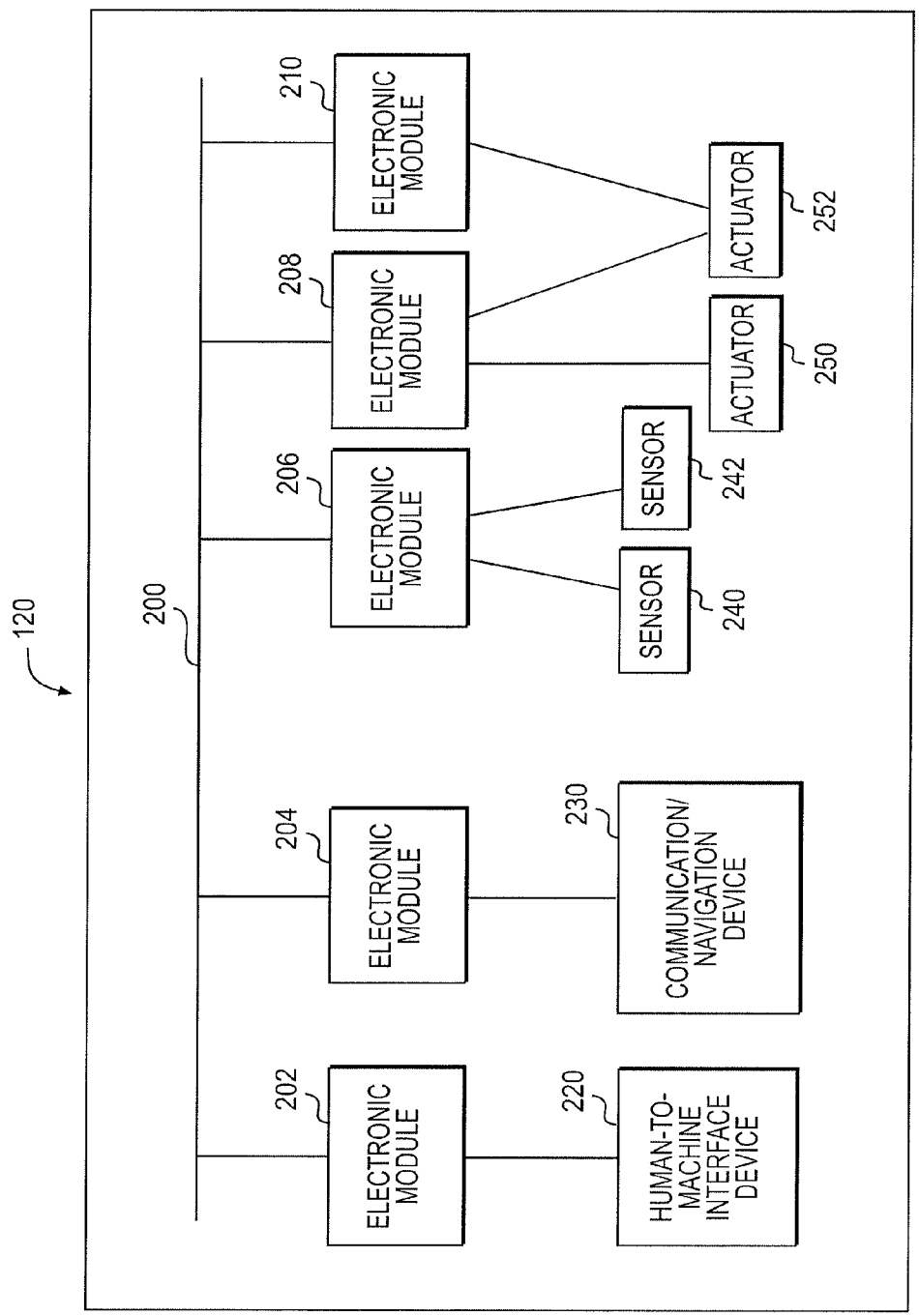
FIG. 2 is a diagrammatic illustration of an exemplary control system that may be used in conjunction with the machine of FIG. 2.

FIG. 2 illustrates elements of an exemplary control system disposed within locomotive 120 of machine 100 for controlling locomotive 120. For example, the control system controls the motion of locomotive 120 by controlling traction power of locomotive engine 140 and dynamic braking of locomotive 120. As shown in FIG. 2, a control system comprises a network 200. Network 200 may include one or more different data communication paths over which data having different communication formats may be transmitted. For example, network 200 may be used to transmit Ethernet TCP/IP based data, RS 232 data, RS422 data, controller area network (CAN) bus data, or a combination of two or more of these data types. In exemplary embodiments, different types of data may use differing parts of network 200. For example, Ethernet data may use a physically separate data communication path of network 200 than CAN bus data. Alternatively, there may be priorities assigned to particular types of data. For example, in one embodiment, messages associated with CAN bus data may be assigned a higher priority than other types of messaging traffic on network 200.

As part of implementing control functions used to control the locomotive, the embodiment illustrated in FIG. 2 includes a plurality of electronic modules 202-210 communicatively coupled to network 200 in a standardized architecture. In other words, electronic modules 202-210 are based on standardized hardware (e.g., similar components, similar boards, etc.), and software that can be flexibly configured and programmed in an architecture that allows for additions depending on the needs of the control system. For example, in one embodiment, a single electronic module 202 may implement a particular control function. But if this control function is deemed or becomes a mission critical control function, an alternative embodiment may implement such a mission critical control function with several electronic modules. Examples of control functions may include, throttle control of the locomotive engine, dynamic braking, etc. In another example, each electronic module 202-210 may host control applications (e.g., software applications) that consume a certain percentage of its processing capacity. Each of the control applications may comprise a plurality of code modules that perform, at least in part, various control functions when executed.

Electronic modules 202-210 may be programmed and configured to communicatively connect to one or more control elements disposed within the locomotive 120. As shown in FIG. 2, exemplary control elements may include a human-to-machine interface device 220. Human-to-machine interface device may be a device that provides feedback to and/or input from a human, such as the operator of the locomotive 120. Human-to-machine interface device 220 may include, for example, one or more of a monitor, a light emitting diode, an indicator, a switch, a button, a keypad, a keyboard, a touchpad, a joystick, a speaker, a microphone, and a credential reader such as finger print scanner or an ID card scanner.

Another example of a control element is a communication/navigation device 230, which may be a device that provides communication within or outside the locomotive 120 or receives/transmits navigational information within or outside the locomotive 120. An example of communication/navigation device 230 may include, for example, one or more of an analog radio, a digital communication receiver/transmitter, a GPS unit, and a tracking transponder.

Sensors 240 and 242 and actuators 250 and 252 are additional examples of control elements operatively connected to one or more electronic modules 206, 208, and 210. Sensors 240, 242 may be any type of device that records or senses a condition or characteristic relative to the locomotive, such as speed, temperature, atmospheric conditions, shock, vibration, frequency, engine conditions, etc. Various voltages (e.g., DC link voltage) and amperages (e.g., blower motor or traction motor amperage) may be used to represent the sensed conditions or characteristics. Similarly, actuators 250, 252 may be any type of device that changes a condition or characteristic relative to the locomotive, such as a throttle, brake, heater, fuel flow regulator, generator, damper, pump, switch, relay, solenoid, etc. In one embodiment, actuators 250, 252 may assist in controlling a mechanical or electrical device.

In an embodiment, a single electronic module may be connected to one or more control elements. For example, as shown in FIG. 2, electronic module 206 may be connected to both of sensors 240 and 242. Alternatively, in one embodiment, electronic module 206 may be connected to sensors 240 and 242, and actuators 250 and 252. The configuration of how many electronic modules may be used with particular control elements will depend on the desired application within a locomotive 120 or other machine 100.

While FIG. 2 shows an exemplary embodiment of a control system with control elements that include sensors, actuators, a communication device, a navigation device, and a human-to-machine interface device, those skilled in the art will appreciate that additional exemplary embodiments may include other control elements useful in monitoring and controlling aspects of locomotive operation.

Figure 3:
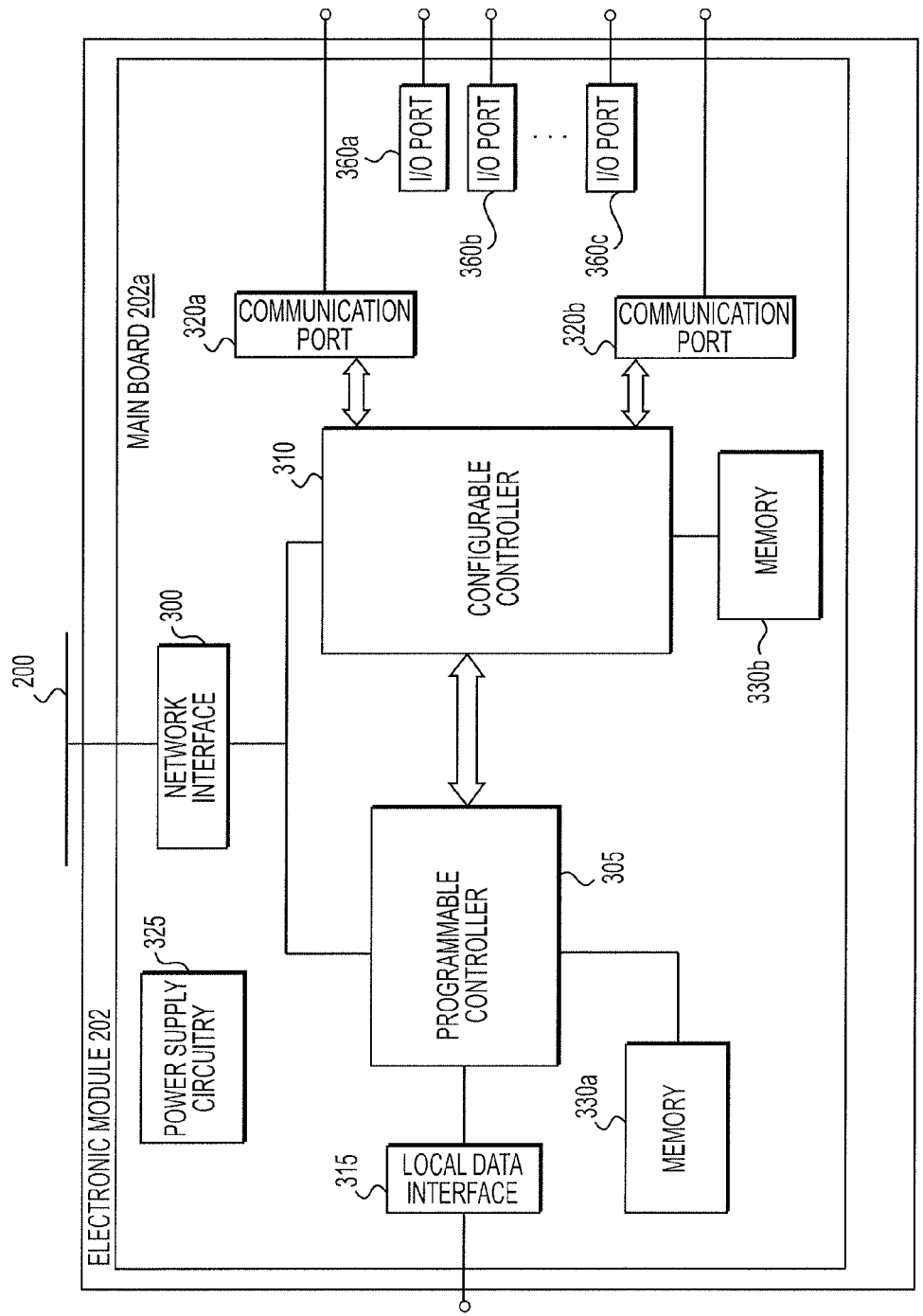
FIG. 3 is a diagrammatic illustration of an exemplary electronic module that may be used in conjunction with the control system of FIG. 2.

FIG. 3 provides a block diagram of exemplary electronic module 202 within the exemplary control system of FIG. 2. As shown in FIG. 3, electronic module 202 may include a main board 202a. Main board 202a may be a standardized board common to other electronic modules 204-210 within the control system. Main board 202a may be a circuit board, motherboard, printed circuit board, or any other electronic board that includes the main board components described hereafter. Electronic module 202 may further include a network interface 300, a programmable controller 305, a configurable controller 310, a local data interface 315, one or more communication ports 320a and 320b, a power supply circuitry 325, and memories 330a and 330b formed on main board 202a.

Power supply circuitry 325 generally provides appropriate power signals to different circuit elements within electronic module 202 such as, for example, network interface 300, programmable controller 305, memory 330a, 330b, configurable controller 310, etc. Various other known circuits may be associated with electronic module 202, including gate driver circuitry, buffering circuitry, and other appropriate circuitry.

Network interface 300 may be configured to communicate with electronic module 202. Network interface 300 may be connected to both of programmable controller 305 and configurable controller 310. In one example, network interface 300 may be an Ethernet switch. However, other types of network or communication interfaces may suffice to operatively connect electronic module 202 to network 200. Additionally, in embodiments where network 200 includes different communication paths or subnetworks, network interface 300 may be implemented with one or more interface circuits to accommodate the different format or different physical paths of network 200. For example, the interface circuits of network interface 300 may accommodate transmission of Ethernet TCP/IP based data, RS 232 data, RS422 data, CAN bus data via network 200. Although not shown in FIG. 3, electronic module 202 may further include one or more network ports, such as Ethernet ports, into which network cables may be plugged.

Configurable controller 310 contains internal circuitry that is configurable to implement control of machine 100. In other words, the internal circuitry of configurable controller 310 may be internally connected, disconnected, reconnected, and/or otherwise altered, in different configurations, to implement one or more control functions associated with the control of machine 100. In one embodiment, configurable controller 310 may work in conjunction with a field programmable gate array (FPGA), and may include programmable logic gates that may be reconfigured as desired. Configurable controller 310 may be configured to include a soft core processor such as the Nios processor included in Altera® FPGAs, or other like core processors. In some embodiments, a control application that is running on configurable controller 310 may require more sophistication and complexity. In this case, the control application may be implemented by both configurable controller 310 and programmable controller 305, which has a higher processing capacity than configurable controller 310. Configurable controller 310 may be connected to memory 330a and 330b. Memory 330a and 330b may be configured to store configuration files used by configurable controller 310 and/or programmable controller 305 to reconfigure the internal circuitry to perform certain functions related to the disclosed embodiments. In some embodiments, memory 330b may also store executable programs to be executed by the soft core processor in configurable controller 310. Memory 330b may include a volatile or non-volatile, magnetic, semiconductor, tape, optical, removable, non-removable, or other type of storage device or computer-readable medium. In some embodiments, configurable controller 310 may be configured to include a memory to store, for example, the configuration files used by configurable controller 310 and/or programmable controller 305.

Programmable controller 305 may be in communication with configurable controller 310 and network 200. Programmable controller 305 is adapted to provide computational support for a control function associated with electronic module 202. Exemplary communication between configurable controller 310 and programmable controller 305 may be accomplished with a peripheral component interconnect express (PCIe) bus or other high speed data bus that facilitates quick and efficient communication between devices when implementing the control function. The control function, such as throttle control of the engine, may be one of a plurality of control functions associated with the control of machine 100. Computational support generally involves an offloaded task that may be accomplished with a processing unit, such as programmable controller 305. Programmable controller 305 may be in direct connection with the control element, such as a throttle actuator (not shown) or speed sensor (not shown). Alternatively, the communication between configurable controller 310 and programmable controller 305 may be accomplished through network 200.

Programmable controller 305 may be removably connected to main board 202a. The software of programmable controller 305 may be programmed to provide computational support to electronic module 202. For example, Programmable controller 305 may provide support for various computational tasks, thus allowing for a more complex implementation of application than configurable controller 310. For example, programmable controller 305 may provide for asymmetric multiprocessing, mathematical processing, or other processing or co-processing functions known in the art. Programmable controller 305 may have a higher processing capacity than configurable controller 310 in terms of execution rate of instructions. Programmable controller 305 may be a microcontroller, a microprocessor, a Computer-On-Module (COM), or a System-On-Module (SOM). For example, a SOM may have a processing capacity of 1-4 billion instructions per second. In one example, programmable controller 305 may be programmatically tasked with monitoring network 200 for messages. Programmable controller 305 may communicate with memory 330a formed on main board 202a of electronic module 202. Memory 330a may be used to store programs to be executed by programmable controller 305. Similar to memory 330b, memory 330a may include a volatile or non-volatile, magnetic, semiconductor, tape, optical, removable, nonremovable, or other type of storage device or computer-readable medium. Alternatively, programmable controller 305 may communicate with other local peripheral devices not formed on main board 202a (e.g., control elements 230, 240, 242, 250 and 252) via a local data interface 315. Local data interface 315 may be implemented, for example, using a USB or SATA format.

In some embodiments, configurable controller 310 of electronic module 202 may communicate with one or more operatively connected devices via the one or more communication ports 320a and 320b. In such embodiments, via input and output (I/O) ports 360a-360c, configurable controller 310 of electronic module 202 may communicate with one or more control elements of other electronic modules 204-210 within the control system.

In some embodiments, one or more of I/O ports 360a, 360b, and 360c may be a CAN port that enables communication between electronic module 202 and other control elements that require CAN bus data. For example, an Electro Motive Diesel Engine Controller (EMDEC) which controls the locomotive engine may communicate with one or more elements via the CAN port. For example, an EMDEC may communicate via CAN transmission with network interface 300, programmable controller 305, configurable controller 310, etc. Since CAN data transmission has a relatively stringent timing requirement, there is no need for an interface controller to control data transmission.

Programmable controller 305 and configurable controller 310 may overlap in terms of their functions. That is, each one of programmable controller 305 and configurable controller 310 may independently interface with network 200 via network interface 300 to receive, process, initiate, and/or transmit messages. In addition, each one of programmable controller 305 and configurable controller 310 may have a processing capacity to host one or more control applications. However, programmable controller 305 may have a substantially large processing capacity, while configurable controller 310 may have relatively limited processing capacity. According to one embodiment, programmable controller 305 and/or configurable controller 310 may work either individually or in concert to host one or more control applications. Control applications may be stored on memory 330a, 330b, or another operatively connected non-transitory computer-readable medium.

INDUSTRIAL APPLICABILITY

The disclosed control system and methods provide a robust and improved solution for identifying faulty code modules in a control application. The disclosed systems and methods are able to identify one or more code modules that were executing when the control system entered into a failure condition. Because the disclosed system and methods provide for an improved method of code fault identification, a substantial reduction in technician time and machine down-time may be realized when servicing the malfunctioning control system. The operation of control system to identify faulty control modules will now be described with respect to FIG. 4.

Figure 4:
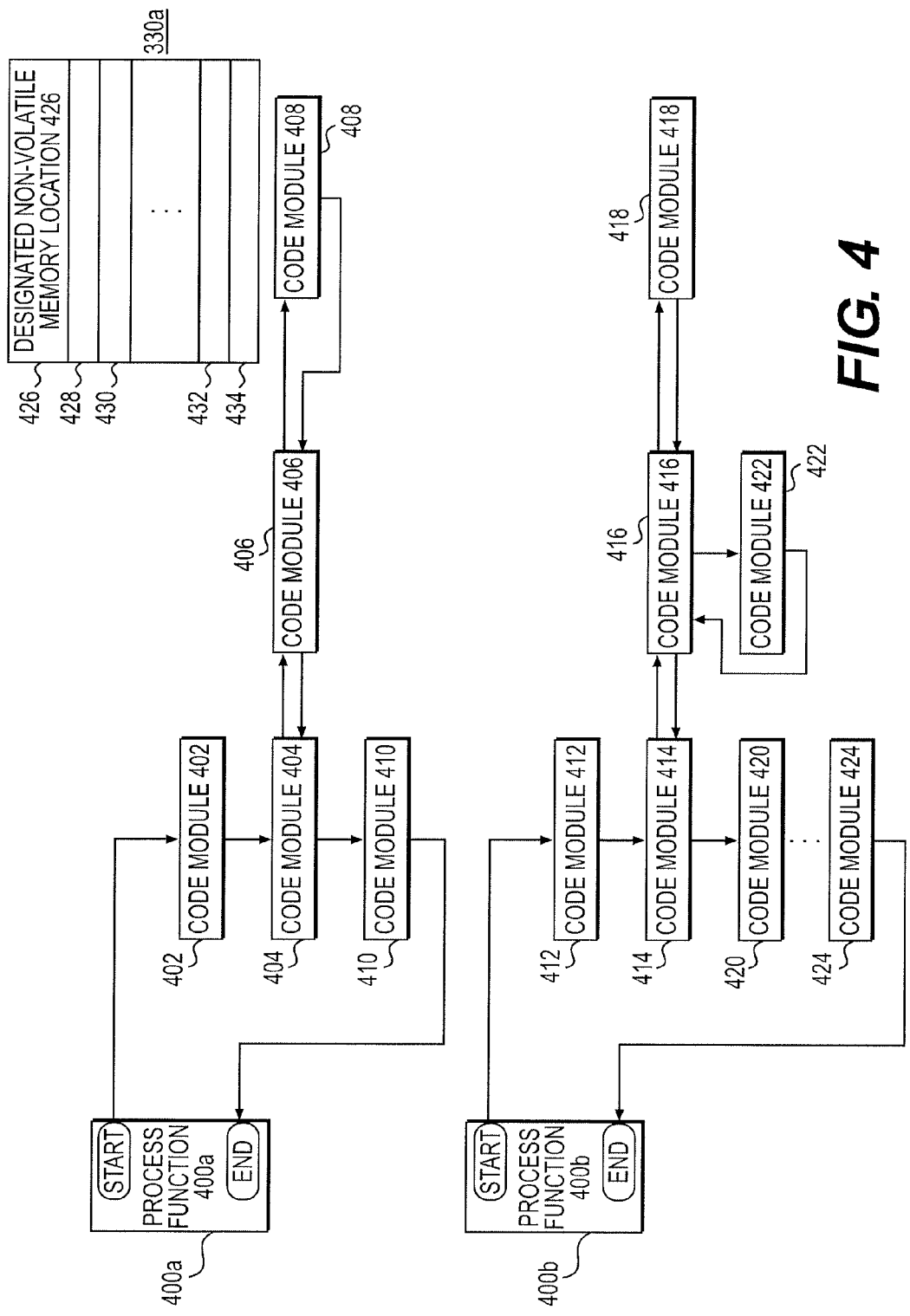
FIG. 4 is a diagrammatic illustration of exemplary process functions that may be used in conjunction with the electronic module of FIG. 3.

FIG. 4 provides a diagrammatic illustration of two process functions 400a and 400b of an exemplary control system software application used in conjunction with electronic module 202. A process function may control one or more functions of machine 100, such as, for example, dynamic braking or engine throttle control. Exemplary process function 400a may include code modules 402-410. Exemplary process function 400b may include code modules 412-424. The code modules 402-410 and 412-424 are exemplary only with respect to number and configuration. Those skilled in the art appreciate that control software may contain thousands of code modules, in many possible configurations.

Generally, a code module is part of a source code within a larger computer program. A code module (i.e., subroutine, procedure, function, subprogram, etc.) may contain an entire computer program, or may contain part of a computer program. A code module may behave in much the same way as a computer program, and may be processed by "execution." Execution is a process by which the control system may carry out the instructions of a computer program or a code module. In the case of a code module, the written instructions contained within the code module are processed by electronic module 202 to produce specified actions on the control system according to the semantics of the written instructions. The instructions are generally processed within one or more computer processors. Thus, a code module can be said to begin executing when the control system commences processing the written instructions of the control module. A code module can be said to have completed executing when the control system has finished processing the written instructions of the code module according to the particular semantics of the instructions. If a control module has "completed executing," then the whole set of written instructions contained in the code module have been processed by the control system without the occurrence of a fault. A control module has "executed" when the written instructions of the code module are processed in their entirety according to the particular semantics of the instructions of the module. A code module in a process function maybe executed one time or many times, depending on the particular instructions of the control function and/or the process function. The written instructions of the code module typically have instructions that "call" another code module. A code module is "called" when the instructions of the code module direct the control system to begin executing another code module. The code module containing the instructions to begin executing another code module "calls," and the code module next in line for processing is "called". Those skilled in the art understand that the written instructions of a code module may also direct the control system to perform many other functions not explicitly stated herein.

When process function 400a is executed by electronic module 202, each of the code modules of 400a may be executed according to a predetermined order programmed in process function 400a. According to one embodiment, process function 400a calls code module 404 when execution of code module 402 is complete. While code module 404 is executing it may call code module 406 which in turn may then call code module 408. Each of the code modules of process function 400a do not necessarily execute in order, depending on the configuration of the process function. For example, code module 404 may or may not call code module 406, that in turn may or may not call code module 408. But eventually code module 404 completes its execution and then code module 410 is called, and completes the process 400a.

When one of the code modules does not execute as intended (typically due to a coding defect), it can corrupt data or prevent other functions from running by going into an infinite loop and can cause the system to enter into a failure condition, reset, or otherwise not function properly. Typically, the faulty code module is in the middle of executing its code when the control system enters into a failure condition. When only one function is executing prior to the failure condition, determining the faulty control module may not be a difficult task. However, in modern control systems multiple process functions typically run at one time.

When process functions run simultaneously, one process function may pause processing its code modules, to allow another process function to begin and/or complete processing before proceeding. If two or more process functions run at different clock speeds, keeping track of active code modules may become extremely difficult. For example, process function 400a may execute some or all of code modules 402-410 every second, and process function 400b may execute some or all of code modules 412-424 at a much faster rate, such as every 100 milliseconds. When process functions 400a and 400b operate in parallel, process function 400b, which is running at a faster rate may interrupt the other to accommodate an assigned execution priority for each process function. another by interrupting process function 400a at each execution of the process function. When control process functions are assigned a relative priority (e.g., process function 400b is assigned priority over 400a), then programmable controller 305 pauses execution of 400a, allocates one or more processors to the execution of process function 400b, and may finish executing 400b prior to resuming execution of the next operation of 400a (in this case, code module 402). Consequently, there may not be any sequential order in the way a multi-process function process operates. In this common situation, when a faulty code module causes the control system to enter into a failure condition, determining which of the plurality of active code modules is the faulty code module becomes extremely difficult.

In one exemplary embodiment, the control system may identify a software fault by identifying a specific code module that was executed just before a failure condition. Accordingly, memory 330a and 330b may include non-volatile memory containing a plurality of designated non-volatile memory locations. In such an exemplary embodiment, each location may be designated to receive a code module execution status for a corresponding one of a plurality of code modules executed prior to the execution of the code module containing the code fault. For example, each code module 402-424 may include computer program codes that direct programmable controller 305 to write a value for a code execution status (for example, 1) to a designated non-volatile memory location 426 as a code module begins execution. A value of 1 may be indicative of processing of the written instructions of the code module. Accordingly, as programmable controller 305 executes code module 402, programmable controller 305 may write a code module execution status (e.g., 1) to designated non-volatile memory location 426. When code module 402 ends its execution by calling the next code module, programmable controller 305 may overwrite a second code module execution status (e.g., 0) to the same designated memory location 426. A value of 0 may be indicative of completing the processing of the written instructions of the code module. Next, as code module 404 begins execution, programmable controller 305*a* may write a 1 to another designated non-volatile memory location 428. When code module 404 ends its execution, programmable controller 305 may write a 0 to designated non-volatile memory location 428, and so on.

A code module execution status may also include a code module identifier that uniquely identifies the code module. For example, the code module execution status may be "0" in combination with a unique code that identifies the particular code module to which the non-volatile memory location is designated. If the control system resets or enters into a failure condition while a code module is in the middle of executing its code, each non-volatile memory location 426-434 contains a non-volatile record of the execution of its corresponding code module. The record of the execution gives an indication of whether the code module began and ended execution without experiencing a fault due to a faulty code module. For example, the record may be the hexadecimal value of "1," indicating that the system entered into a failure condition while the written instructions of the corresponding code module were being processed. As another example, the record may be the hexadecimal value of "0," indicating that the code module was not executing at the time of the failure condition. Designated non-volatile memory locations 426-434 are exemplary in number and configuration, and may contain millions of designated non-volatile memory locations according to an alternative embodiment.

For example, if the control system resets as a result of the code fault in the middle of code module 402's execution, or if the control system freezes and requires a power cycle (power down and power up again) during the execution of code module 402, programmable controller 305 may access each of the designated memory locations 426-434 and retrieve the stored code module execution statuses (i.e., the non-volatile record). Accordingly, programmable controller 305 may identify, based on the code module execution status, the code module that contains the code fault. Programmable controller 305 may also create a human-readable list of modules that were active before control system is reset.

Figure 5:
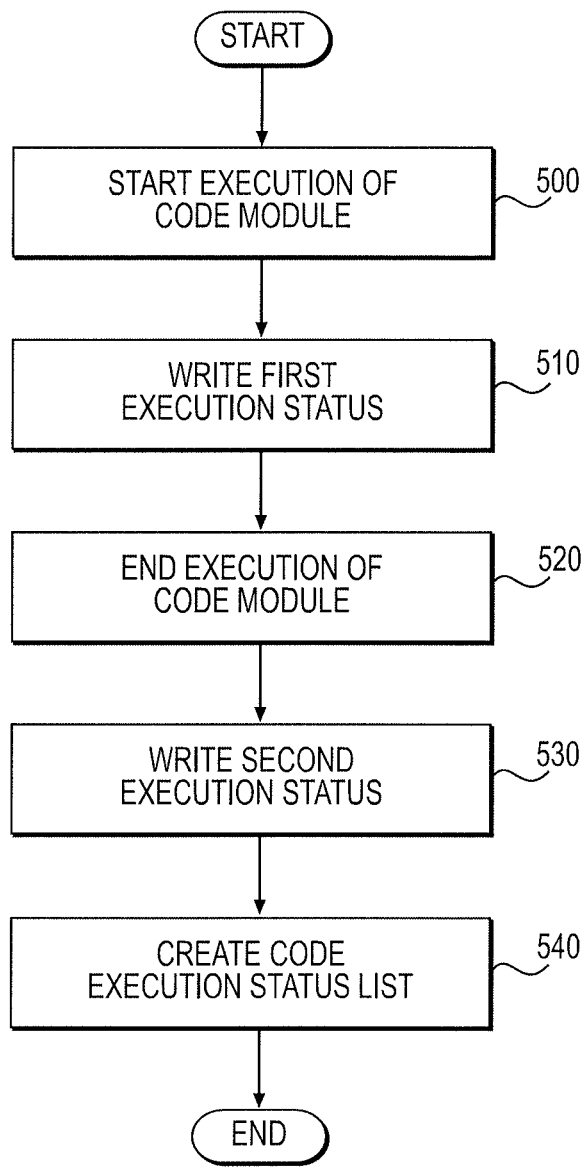
FIG. 5 provides a flowchart depicting an exemplary method for identifying a faulty code module in a locomotive of FIG. 1 according to an embodiment of the present disclosure.

FIG. 5 illustrates a flowchart describing a method for identifying a code fault in an electric module containing at least one programmable controller 305. The programmable controller 305 may store a plurality of code modules 402-424. During the first step of the computer code fault identification process, programmable controller 305 executes a code module (Step 500). Next, programmable controller 305 writes a first code module execution status (for example, a 1) to a designated memory location on electronic module 202 (Step 510). If the code module has completed executing without a code fault (Step 520), programmable controller 305 overwrites the first code module execution status with a second code module execution status (for example, a "0") (Step 530).

According to one embodiment, programmable controller is configured to identify the code module containing the code fault. The programmable controller 305 may do this by finding the one or more code modules from the plurality of code modules that were being executed prior to the execution of the code module that contains the code fault. Accordingly, when the programmable controller has been reset due to the code fault, the programmable controller may identify the code module containing the code fault by analyzing the data stored in the non-volatile memory 426-434.

According to another embodiment, programmable controller 305 may create a human-readable list of code execution statuses. (Step 540). The human-readable list may be derived from the plurality of designated memory locations containing the code module execution status for each of the of code modules executed prior to the execution of the code module that contains the code fault. A human-readable list may include data encoded as ASCII or Unicode text, rather than the data being presented in a binary, hexadecimal, or other computer code representation that requires translation into a human-readable format.

According to another embodiment, programmable controller 305 may create a plurality human-readable lists, each list including execution status data from a plurality of executions of at least one code module that includes at least one code fault. In this embodiment, the plurality of human-readable lists may be configured to indicate one or more code modules that were executed before the code fault caused a failure condition. The programmable controller may also be configured to create a plurality of human-readable lists, where the lists contain data that represents the execution status of code modules that were active just prior to two or more occurrences of a failure condition.

In yet another embodiment, the plurality of human-readable lists may include execution status data from two or more of a plurality of code modules, wherein the two or more modules from the plurality of code modules 402-424 contain two or more code faults. Accordingly, each list of the plurality of human-readable lists may include the execution status data from a single reset of the at least one programmable controller.

The presently disclosed control system may have several advantages. Specifically, the presently disclosed control system avoids undesirably high costs of debugging a code fault in complex control system software. The high costs are generally associated with writing custom de-bug software at each occurrence of a code module fault, and installing the custom software on each of the thousands of code modules in order to identify the one or more code module faults. The high maintenance costs and system downtime may be avoided by using the presently disclosed control system and methods.

It will be apparent to those skilled in the art that various modifications and variations can be made to the disclosed control system for a machine 100, such as a locomotive 120, and associated methods for operating the same. Other embodiments will be apparent to those skilled in the art from consideration of the specification and practice of disclosed control system to identify faulty code modules. It is intended that the specification and examples be considered as exemplary only, with a true scope being indicated by the following claims and their equivalents.

What is claimed is:

1. A control system, comprising:
an electronic module, the electronic module comprising at least one programmable controller storing a plurality of code modules, and a non-volatile memory in communication with the at least one programmable controller, wherein
the non-volatile memory comprises a plurality of designated memory locations, each location designated to receive a code module execution status for a corresponding one of the plurality of code modules executed prior to execution of the code module containing the code fault; and
the at least one programmable controller is configured to identify from the plurality of code modules a code module that contains a code fault, by:
executing the plurality of code modules;

writing a first code module execution status to a designated memory location on the electronic module when the code module has started executing;

writing a second code module execution status to the designated memory location when the code module has completed executing; and identifying, based on the code module execution status, the code module that contains the code fault.

2. The control system of claim 1, wherein the second code module execution status overwrites the first code module execution status.

3. The control system of claim 2, wherein the at least one programmable controller identifies the code module containing the code fault in response to the at least one programmable controller has been reset due the code fault.

4. The control system of claim 3, wherein the at least one programmable controller creates a human-readable list of code module execution statuses based on the plurality of designated memory locations, wherein the human-readable list contains the code module execution statuses for each code module executed prior to the execution of the code module that contains the code fault.

5. The control system of claim 1, wherein the code module execution status includes a code module identifier.

6. The control system of claim 4, wherein the at least one programmable controller creates a plurality of human-readable lists.

7. The control system of claim 1, wherein identifying the code module that contains the code fault includes:

writing, with the at least one programmable controller, data that identifies the code module that contains the code fault to a non-volatile memory location when the at least one programmable controller has been reset due to the code fault.

8. The control system of claim 7, wherein identifying the code module that contains the code fault includes identifying two or more code faults.

9. A method for identifying a code fault in an electronic module, comprising:

storing a plurality of code modules on the electronic module, wherein the electronic module comprises a non-volatile memory having a plurality of designated memory locations, each location designated to receive a code module execution status for a corresponding one of the plurality of code modules executed prior to execution of the code module containing the code fault;

executing, with at least one programmable controller, plurality of code modules, whereby, for each control module:

writing a first code module execution status to a designated memory location on the electronic module when the code module has started executing;

writing a second code module execution status to the designated memory location when the code module has completed executing; and identifying, based on the code module execution status, the code module that contains the code fault.

10. The method of claim 9, wherein each one of the plurality of designated memory locations includes an execution status for a unique execution of one of the plurality of code modules.

11. The method of claim 10, wherein the second code module execution status overwrites the first code module execution status.

12. The method of claim 11, further including:

resetting the at least one programmable controller; and identifying the code module containing the code fault from the plurality of code modules executed prior to the execution of the code module that contains the code fault if the at least one programmable controller has been reset due to the code fault.

13. The method of claim 12, further including:

creating a human-readable list of code module execution statuses based on the plurality of designated memory locations containing the code module execution status for each code module executed prior to the execution of the code module that contains the code fault.

14. The method of claim 9, wherein the code module execution status includes a code module identifier.

15. The method of claim 13, further including:

creating a plurality human-readable lists with the at least one programmable controller, wherein each list of the plurality of human-readable lists includes information that identifies the code module containing the code fault from the plurality of code modules executed prior to the execution of the code module that contains the code fault.

16. The method of claim 9, wherein identifying the code module that contains the code fault includes:

writing, with the at least one programmable controller, data that identifies the code module that contains the code fault to a non-volatile memory location when the at least one programmable controller has been reset due to the code fault.

17. The method of claim 16, wherein identifying the code module that contains the code fault includes identifying two or more code faults.

18. A control system for a machine, comprising:

an electronic module comprising at least one programmable controller, wherein the at least one programmable controller comprises a plurality of code modules; and a memory including a plurality of designated non-volatile memory locations in communication with the at least one programmable controller, wherein each of the plurality of designated non-volatile memory locations is configured to receive a code module execution status for each of the plurality of code modules executed prior to execution of a code module containing a code fault, wherein the at least one programmable controller is configured to identify the code fault, by:

executing the code module;

writing a first code module execution status to a designated non-volatile memory location from the plurality of designated non-volatile memory locations when the code module has started executing;

writing a second code module execution status to the designated non-volatile memory location when the code module has completed executing; wherein the second code module execution status overwrites the first code module execution status; and identifying, based on the code module execution status, the code module that contains the code fault.

* * * * *